United States Patent Office 3,477,511
Patented Nov. 11, 1969

3,477,511
PROCESS FOR THE RECOVERY OF PETROLEUM USING SOLUBLE OILS
Stanley C. Jones, Littleton, Colo., Laurence R. Sanders, Jr., Detroit, Mich., William C. Tosch, Parker, Colo., and Charles B. Wenger, Park Forest, Ill., assignors to Marathon Oil Company, Findlay, Ohio., a corporation of Ohio
No Drawing. Continuation-in-part of application Ser. No. 610,803, Jan. 23, 1967. This application Sept. 13, 1968, Ser. No. 759,782
Int. Cl. E21b 43/22
U.S. Cl. 166—274
15 Claims

ABSTRACT OF THE DISCLOSURE

The present invention comprises recovery of petroleum by injection into petroleum-bearing formations of a slug of soluble oil comprising specially selected cosurfactants. The soluble oil slug comprises about 20 to 80% hydrocarbons; about 0.01 to 10% oil-soluble, substantially water-insoluble cosurfactant; about 2-20% surfactant; and about 5 to 55% water (all percents being percent by volume of the total slug). A fluid drive material, e.g., water or thickened water, may be injected into injection wells to move the slug and displace petroleum toward production wells.

Cross references to related applications

This application is a continuation-in-part of my copending United States patent application Ser. No. 610,-803, filed Jan. 23, 1967.

Background of the invention

The present invention pertains to the art of displacing petroleum fluids within subterranean reservoirs in order to permit the recovery of such fluids While the present invention will be particularly perferred for customary secondary and tertiary recovery of petroleum it will also find application in primary production, e.g. in those instances where the natural gas drive is not sufficient to provide the desired rate of production from the formation.

A variety of slugs have been previously used in oil recovery, for example those of Maly in U.S. 2,976,926, Holm in U.S. 3,065,790; Holm and Bernard in U.S. 3,082,822; Jones in U.S. 3,126,952; Csazer in U.S. 3,127,934 and Gogarty and Olson in U.S. 3,254,714. The latter patent teaches especially valuable methods utilizing soluble oils. Soluble oils, as used herein, include the compositions commonly known as micellar dispersions, micellar solutions, "microemulsions," "transparent emulsions," "fine emulsions," etc. Essentially, soluble oils are substantially clear, stable dispersions of a polar fluid, such as water in a non-polar medium, such as a hydrocarbon. As is well known, the efficiency of an oil recovery process is determined by the amount of oil recovered in flooding operations compared to the amount of oil in the formations at the time flooding is initiated. To have good efficiency, the flooding media should have a mobility, at least at its leading edge, about that or slightly less than that of the formation fluids being displaced. Such soluble oils are preferably composed of mixtures of crude petroleum liquid or fractions thereof; water; and a surfactant. In most such soluble oils a co-surfactant such as a water-soluble alcohol is added to achieve proper viscosity and a stable composition under the conditions present in the reservoir. However, regardless of the composition initially injected, the water-soluble alcohol or other water-soluble (co-surfactant) is frequently, gradually leached out from the slug by the connate water usually encountered in petroleum bearing formations. Also, in tertiary recovery applications, the co-surfactant may be leached out by the water remaining from a secondary water flood.

Summary

The present invention offers new methods for avoiding or minimizing this leaching of the co-surfactant from the slug and the attendant loss of stability and viscosity control of the slug by substitution of a substantially water-insoluble, substantially oil-soluble co-surfactant, for at least a portion of the water soluble co-surfactant previously used. This technique retains the excellent properties of the soluble oil flood, and in fact permits the slug to be moved an even greater distance through the formation without deterioration due to extraction of co-surfactant by the connate or other water present in the formation.

The soluble oil slugs of the present invention will consist of preferably about 20 to 80, more preferably about 25 to 75 and most preferably about 30 to 70% of a hydrocarbon e.g. crude oil, kerosene, straight run gasoline, naphtha, propane, butanes, pentanes, or mixtures thereof.

The soluble oil slugs of the present invention will comprise preferably about 2 to 20, more preferably 3 to 15, and most preferably about 5 to 12% of a non-ionic, cationic or anionic surfactant, or compatible combinations thereof. Examples of such surfactants include sodium glyceryl monolaurate sulfate, dihexyl sodium succinate, hexadecylnaphthalene sulfonate, diethylenegloycol sulfate, glycerol disulfoacetate monomyristate, p-toluidine sulfate laurate, p-chloroaniline sulfate laurate, p-sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyldiethyleneglycol sulfate, monobutylphenyl phenol sodium sulfate, and triethanolamine laurate or triethanolamine oleate.

Anionic surfactants, such as higher alkylaryl, sulfonates, particularly alkylnaphthenic monosulfonates having an empirical formula approximating $C_nH_{2n-10}SO_3Na$, wherein $n=20$ to 30 and the alkyl radical contains from from about 10 to 25 carbon atoms, are preferred. The sodium salts of dialkylsuccinates are also particularly desirable surfactants for use in making up bank materials. It is preferred that the alkyl radicals of the succinate compounds contain from about 6 to about 10 carbon atoms.

The type of surfactant utilized depends upon the temperature of the formation and the hardness, including salinity, and pH of the connate water and the water used to make up the bank material. It would be futile to use a detergent such as sodium oleate in a formation containing relatively high concentrations of calcium and magnesium ions, as the precipitated calcium and magnesium soaps would plug the formation. Similarly, where there is a natural detergent in the crude, a surfactant having a similar ionic charge must be used to avoid precipitating an insoluble reaction product.

The soluble slugs of the present invention comprise preferably about 5 to 55, more preferably 10 to 50, most preferably about 20 to 45% of water. Water used in preparing the soluble oils can be brackish.

The slugs of the present invention will preferably comprise about 0.01 to 10, more preferably 0.05 to 5, and most preferably 0.1 to 2.0% co-surfactant. The co-surfactants of the present invention must be soluble in oil and substantially insoluble in water. While minor amounts of solubility, e.g. up to about 10%, in water may be tolerated, they will generally be compensated for by adding some additional co-surfactant. The most preferred co-surfactants of the present invention are those which are virtually insoluble in water and are totally soluble in the hydrocarbon phase of the particular soluble oils being used. Some of the preferred co-surfactants of the present invention are: nonylphenol, 2-octanol, nonylphenol-polyoxyethylene compounds containing about 40 to 50% by weight ethylene oxide and marketed by Aquaness Chemical Company under the designation OX–126, hexylcarbitol, Pluracol P1010 (polypropyleneglycol manufactured by Wyandotte Chemicals Corporation), n-amyl alcohol, hexadecyl alcohol, and cyclohexanol, iso-octanol, benzyl alcohol, hexyl alcohol, iso-amyl alcohol, iso-butyl alcohol, cresol, octylphenol, plus many other commercial Tradename products.

The more conventional co-surfactants which are wholly or partially replaced by the co-surfactants of the present invention are the lower alcohols (having less than about four carbon atoms in the principal chain), the most preferred being isopropyl alcohol, and methyl alcohol and ethyl alcohol, secondary butyl alcohol, tertiary butyl alcohol, tertiary amyl alcohol, and some ketones such as acetone.

In general, the slug compositions of the present invention will be prepared by producing a pre-stock composed of sulfonate plus straight run gasoline, or other hydrocarbon with the co-surfactant of the present invention. This material will then be mixed with water to achieve the final slug composition. Conventional mechanical agitation, will generally accomplish the mixing. High shear agitation may be used should the soluble oil prove difficult to produce. The soluble oils of the present invention are, of course, to be formulated according to the usual characteristics of such materials including the absence of any Tyndall effect and good phase-stability on standing.

In practice, the soluble oils will be conventionally injected into at least one injection well located in a subterranean formation and thereafter moved through the formation so as to displace petroleum hydrocarbons in place toward at least one production well in the formation. The slug is moved by displacement, e.g. with water, thickened water or other fluids previously used as displacing agents in conventional secondary and tertiary recovery methods. The usual techniques of injection such as "pattern" flooding through a series of injection wells in order to form a moving bank of slug and drive fluid may be utilized, as may any of the other conventional techniques which are not incompatible with the slugs and purposes of the present invention.

EXAMPLE

The prime usefulness of this invention is that by employing a substantially water-insoluble, essentially oil-soluble co-surfactant, the soluble oil will not suffer extreme viscosity build-ups upon contact with reservoir connate brines. An example to show this follows:

A prestock containing 17% by volume alkyl aryl ammonium sulfonate and 83% by volume heavy naphtha is prepared. To 28 parts by volume prestock is added 12 parts by volume Palestine Line Water containing about 100 p.p.m. total dissolved solids. Additional NaCl was added to this water. Eight tenths parts by volume isopropyl alcohol is also added. To this basic composition is added varying amounts of nonylphenol to make soluble oils. These soluble oils are then shaken with a connate water of about 30,000 p.p.m. total dissolved solids (about 18,000 p.p.m. Cl—). The slug top and brine bottom layers are allowed to layer out. The viscosity of the resultant top slug layer is measured, and tabulated in Table I.

TABLE I.—VISCOSITY REDUCTION OF A SOLUBLE OIL BY ADDITION OF NONYLPHENOL

| Mg. of NaCl added to 12 mls. of Palestine Line Water | Mils of Nonylphenol Solution [1] added to 40.8 mls of Soluble Oil | Soluble Oil Viscosity before contact with Brine, cp. | Soluble Oil Viscosity after Contact with Brine, cp. | Volume percent Water in Slug after contact with Brine |
|---|---|---|---|---|
| 0 | 0.00 | 21.3 | 570 | 25.7 |
| 0 | 0.08 | 26.2 | 107 | 21.4 |
| 0 | 0.12 | 29.5 | 46 | 21.1 |
| 0 | 0.16 | 37.5 | 23.7 | 19.8 |
| 50 | 0.00 | 24.9 | 545 | 25.3 |
| 50 | 0.08 | 36.0 | 103 | 21.1 |
| 50 | 0.12 | 48.1 | 40 | 19.2 |

[1] Solution consists of 50% (by volume) nonylphenol and 50% heavy naptha.

Analyses of the resultant brine bottom layers after this experiment was finished showed that isopropyl alcohol had been leached out from the soluble oils. In the absence of the oil-soluble co-surfactant, the resultant soluble oil viscosities were very high—570 cp. and 545 cp., as shown in the table.

What is claimed is:

1. The process for recovering fluid hydrocarbons from fluid petroleum-bearing subterranean formations having drilled therein at least one each of a production well and an injection well comprising;
   (a) injecting into the subterranean formation at least one slug of a soluble oil comprising about 20 to 80% hydrocarbons about 0.01 to 10% oil-soluble, substantially water-insoluble cosurfactant comprising at least one of the following compounds: nonylphenol, 2-octanol, hexylcarbitol, n-amyl alcohol, hexadecyl alcohol, polypropylene glycol, nonylphenol-polyoxyethylene compounds containing from about 40% to about 50% ethylene oxide, and substantially water-insoluble aliphatic alcohols, about 2 to 20% surfactant, about 5 to 55% water, all percents being percent by volume of the total slug;
   (b) moving slug through said formation in such direction as to displace petroleum toward at least one of said production wells;
   (c) recovering oil from said formation through said production well.

2. The process of claim 1 in which said slug is moved through said formation under the action of a fluid drive material.

3. The process of claim 2 wherein the drive material comprises a major portion of water.

4. The process of claim 3 wherein the drive material consists essentially of thickened water.

5. The process of claim 1 wherein the soluble oil slug material comprises;
about 25 to 75% hydrocarbons
about 0.05 to 5% co-surfactant
about 3 to 15% surfactant
about 10 to 55% water.

6. The process of claim 1 wherein the co-surfactant comprises a major portion of nonylphenol.

7. The process of claim 1 wherein the co-surfactant comprises a major portion of 2-octanol.

8. The process of claim 1 wherein the co-surfactant comprises a major portion of hexylcarbitol.

9. The process of claim 1 wherein the co-surfactant comprises a major portion of n-amyl alcohol.

10. The process of claim 1 wherein the co-surfactant comprises a major portion of hexadecyl alcohol.

11. The process of claim 1 wherein the co-surfactant comprises a major portion of polypropylene glycol.

12. The process of claim 1 wherein the co-surfactant comprises a major portion of nonylphenol-polyoxyethylene.

13. The process for recovering fluid hydrocarbons from fluid petroleum-bearing subterranean formations having drilled therein at least one each of a production well and an injection well comprising;
   (a) injecting into the subterranean formation at least one slug of a soluble oil comprising about 20 to 80% hydrocarbons about 0.01 to 10% oil-soluble, substantially water-insoluble cosurfactant, about 0.1 to 10% of a cosurfactant which is water-soluble and oil-soluble, about 2 to 20% surfactant, about 5 to 55% water, all percents being percents by volume of the total slug,
   (b) moving said slug through said formation in such direction as to displace petroleum toward at least one of said production wells,
   (c) recovering oil from said formation through said production well.

14. The process of claim 1 wherein the cosurfactant comprises a major portion of hexyl alcohol.

15. The process of claim 1 wherein the cosurfactant comprises a major portion of substantially water-insoluble aliphatic alcohols.

References Cited

UNITED STATES PATENTS

| | | | |
|---|---|---|---|
| 2,331,594 | 10/1943 | Blair | 252—8.55 |
| 3,082,822 | 3/1963 | Holm et al. | 166—9 |
| 3,126,952 | 3/1964 | Jones | 166—9 |
| 3,131,759 | 5/1964 | Slusser et al. | 166—2 |
| 3,163,214 | 12/1964 | Csaszar | 166—9 |
| 3,254,714 | 6/1966 | Gogarty et al. | 166—9 |

OTHER REFERENCES

The Condensed Chemical Dictionary, 6th Edition, Reinhold Publishing Co., New York, N.Y., 1961 (pp. 313, 325, 861 and 862 relied on).

STEPHEN J. NOVOSAD, Primary Examiner

U.S. Cl. X.R.

166—275